United States Patent

[11] 3,575,671

| | | | |
|---|---|---|---|
| [72] | Inventors | Benjamin Dessus;<br>Rene Lenfant, Paris, France | |
| [21] | Appl. No. | 798,644 | |
| [22] | Filed | Feb. 12, 1969 | |
| [45] | Patented | Apr. 20, 1971 | |
| [73] | Assignee | Compagnie Generale D'Electricite<br>Paris, France | |
| [32] | Priority | Feb. 12, 1968 | |
| [33] | | France | |
| [31] | | 139,558 | |

[54] HIGH POWER MONOMODE LASER STRUCTURE WITH MULTIPLE COUPLED CAVITIES
8 Claims, 4 Drawing Figs.

[52] U.S. Cl. .................................................. 331/94.5,
356/106
[51] Int. Cl. ................................................... H01s 3/08

[50] Field of Search ............................................ 331/94.5;
356/106

[56] References Cited
UNITED STATES PATENTS

| 3,479,612 | 11/1969 | Seidel .......................... | 331/94.5 |
| 3,487,230 | 12/1969 | Costich ....................... | 307/88.3 |
| 3,504,299 | 3/1970 | Fox ............................. | 331/94.5 |

Primary Examiner—William L. Sikes
Attorney—Sughrue, Rothwell, Mion, Zinn & MacPeak ABSTRACT: Single-mode laser energy structure comprising a main cavity and a secondary cavity coupled to the main cavity and formed by a prismatic unit, either disposed in the main cavity containing a laser tube or attached to the laser tube itself.

HIGH POWER MONOMODE LASER STRUCTURE WITH MULTIPLE COUPLED CAVITIES

BACKGROUND OF THE INVENTION

1. Field of the Invention

The present invention relates to gas lasers and more particularly to high-power monomode lasers.

2. Description of the Prior Art

One known method of obtaining a monomode laser beam of high power consists in coupling two laser cavities formed with three mirrors, the two resonant cavities having very different resonance lengths.

The total output energy of a gas laser is substantially proportional to the length of the energized gas column, the distribution of this energy as a function of the radiation frequency being given by a curve of Gaussian form, said to be of Doppler profile. On the other hand, it is known that, in an optical cavity of length $L$, it is only possible for a finite number of oscillation modes to exist, which are separated in frequency by a quantity $\Delta f$ given by the formula $$\Delta f = \frac{c}{2L}$$

In order to have a high output energy, it is thus necessary to use a considerable cavity length, but this great length implies the existence of a fairly large quantity of oscillation modes, which are separated by a distance in frequency of a very small quantity. For example, with a helium-neon laser emitting a radiation at 6,328 A., the width of the Doppler profile is about 1,000 mc./sec. For a laser of which the cavity has a length of 1.50 meters, the distance in frequency between modes is $$\Delta f = \frac{c}{2L} \# 100 \ mc/s$$

100 mc./sec. In the particular case of a laser of which the Doppler profile has a width of 1,000 mc./sec., at least 10 modes can exist in the laser emission.

All the known arrangements of high-power monomode lasers have only been produced for laboratory experiments and none of them are of industrial character.

SUMMARY OF THE INVENTION

The present invention provides a high-power monomode laser having the characteristics of an industrial laser, which is easy to construct, is less costly, is easy to maintain, can be used without any difficulty by an operator who is not a specialist, and does not have the disadvantages of the laboratory lasers.

The present invention constitutes a power monomode laser having two coupled cavities. It comprises a laser tube, of which at least one of the ends is closed by a plate disposed at Brewster incidence and a prismatic element adjacent the said plate and comprising two passages. The first passage extends the passage of the laser tube and has its free end closed by a totally reflecting mirror. The second passage is situated in the plane defined by the first passage and the perpendicular to the plate. The intersection of the first passage and the second passage is closed by at least a partially reflecting surface.

According to another embodiment of the present invention, the monomode laser is particularly characterized in that a laser tube comprising, at one of its ends, a Brewster plate on which is placed a prismatic element comprising two passages. A first passage is on the axis of the laser tube and closed at the end opposite to the Brewster plate by a totally reflecting mirror. The second passage is pierced in the direction corresponding to that of a light ray originating from the laser tube, having traversed the Brewster plate and having undergone a first reflection on the aforesaid mirror and a second reflection on the Brewster plate. The second passage is closed by a totally reflecting mirror. In a laser such as defined above, the output of the light beam is effected through a passage in the extension of the said second passage and on the other side relative to the Brewster plate.

According to one feature of the present invention, the laser tube is formed by a single tubular member consisting for example of fused quartz or silica.

According to another feature of the present invention, the laser is formed by a central tube extended at at least one end by a terminal tube, the junction of these two tubes being obtained by bringing into contact their ends which are cut to form convex and concave spherical surfaces, respectively, thus forming a "ball and socket" joint.

According to another feature of the present invention, at least one of the Brewster plates is mounted on the laser tube by a "ball and socket" joint.

According to another feature of the present invention, the prismatic element is mounted on the Brewster plate by a "ball and socket" joint.

According to another feature of the present invention, at least one of the mirrors is mounted on the prismatic element by means of a transducer, which can with advantage be a piezoelectric ceramic.

According to another feature of the present invention, the other end of the laser tube comprises a Brewster plate. A totally reflecting mirror closing the cavity of the laser is fixed to the end of a sleeve which itself is fixed to the tube in such a way that the space contained between the Brewster plate and the mirror is in practice, insulated from the medium surrounding the laser.

This latter sleeve may form a transducer of piezoelectric ceramics. In this way, a rigid structure is obtained, which has the advantage that it can be easily produced industrially and can be easily manipulated without modifying the intrinsic characteristics of the laser. This structure in addition permits an easy alignment of the optical cavity of the laser as well as the angular cavity, this latter cavity being defined by the faces of the prismatic element which are machined in accordance with angles defined by geometrical optics.

DESCRIPTION OF THE PREFERRED EMBODIMENTS

Figure 1:
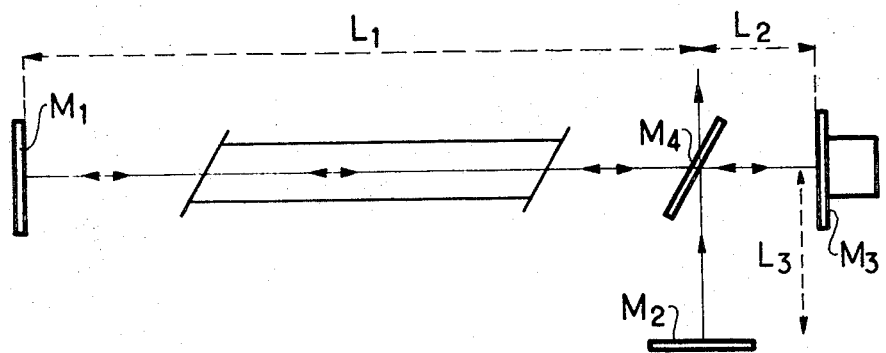
FIG. 1 represents a diagrammatic section illustrating the principle of a double cavity high-power monomode laser.

FIG. 1 illustrates diagrammatically the principle of laboratory lasers which are known at the present time. These lasers comprise two cavities formed by three mirrors $M_1$, $M_2$, $M_3$, one of the cavities being defined by the mirrors $M_1$, $M_3$ and the other by the mirror $M_2$, the semitransparent plate $M_4$ and the mirror $M_3$.

It is known that the response curve of a Fabry-Perot cavity formed by two mirrors is a regular succession of peaks spaced by a half wavelength of the radiation in question.

If the mirrors $M_2$ and $M_3$ have reflection coefficients which are very close to 1, the width of the peaks of the response curve of the resonant cavity formed by these mirrors is very small. This width, represented as frequency, is smaller than the distance in frequency of the possible modes of the rectilinear resonant cavity defined by the mirrors $M_1$ and $M_3$. The presence of two cavities having a common portion makes it possible to superimpose the effects of the two cavities and to select a particular mode in the Doppler profile of the laser formed by the cavity $M_1 \ M_3$.

In order to obtain the mode having the greatest power, the length of the cavity $M_2 \ M_3$ is controlled so that one of its pass bands corresponds to the mode of which the power is greatest, this mode being generally found at the middle of the Doppler profile.

Figure 2:
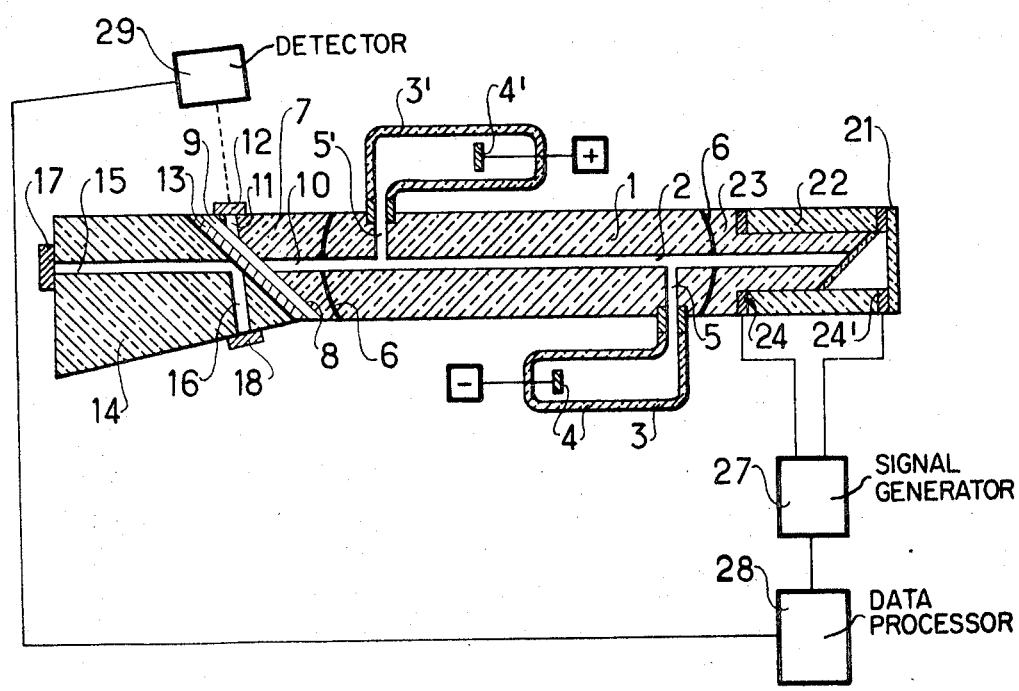
FIG. 2 shows a laser according to the invention in partial diagrammatic form and as a section.

FIG. 2 shows as a diagrammatic section, one structural example of an industrial laser according to the invention. This laser comprises a tube 1 formed with a capillary 2. At each of its ends, this tube carries hollow bulbs 3 and 3', respectively, containing electrodes 4 and 4' connected to the capillary 2 by respective passages 5 and 5'.

The end faces 6 of tube 1 are machined so as to provide a spherical surface, which is shown as being convex in FIG. 2.

Positioned at one of the ends, preferably on the anode side, is a cylindrical element 7 of which one of the ends is machined so as to be in intimate contact with the face 6 of the tube 1 so as to obtain a ball and socket joint. The other end 8 of this element 7 is flat and forms a Brewster angle with a passage 10 which extends from the passage 2 of the tube 1. This passage 10 is closed by a transparent plate 9.

In addition to the passage 10 in alignment with the passage 2, the element 7 has a second passage 11 which forms, with the forgoing passage, an angle which is equal to twice the Brewster angle, the passage 11 being disposed in the plane defined by the passage 10 and the perpendicular to plate 9.

The passages 10 and 11 are on the other hand machined so that their axes are coincident at one point of a face 13 of plate 9, the face 13 being that face not in contact with element 7. This face 13 is covered with a semireflecting layer having a reflection coefficient of the order of 0.5 to 0.7. In order to protect the interior of the passage 11 from ambient atmosphere, this passage is closed by a plate 12 which is transparent to the laser radiation under consideration.

Positioned on the face 13 of the plate 9 is a prismatic element 14 which also comprises two passages. A first passage 15 is formed at the extension of the passage 2 of the tube 1, while a second passage 16 is formed coaxially with passage 11. The passages 2, 11, 15 and 16 are convergent. Passages 15 and 16 are closed by totally reflecting mirrors 17 and 18. The mirror 18 may be mounted on the element 14 by means of a piezoelectric ceramic 19, FIG. 3, which makes it possible to control the length of the cavity formed by the mirrors 17, 13 and 18.

At the other end of the laser tube, on the cathode side, the tube 1 is closed by a Brewster plate and comprises a reflector device formed by a mirror 21 mounted on a sleeve 22 which may consist of a piezoelectric ceramic. This reflector device assembly may be mounted on an element 23 similar to element 7, comprising a spherical surface forming a ball and socket joint, in intimate contact with the surface 6 of the end of the tube 1.

All the elements which are included in the composition of this laser structure are elements which generally consist of fused quartz. They may be assembled by cementing, but in order to give greater rigidity to the monomode laser as thus produced, it is advantageously possible for all these molten quartz elements to be welded by applying laser radiation thereto.

Only one particular embodiment of a laser according to the invention is shown in FIG. 2. For convenience in construction and especially in alignment of the cavity, it is also possible to mount the Brewster plate 9 on the tube and the prismatic element 14, having slightly spherical faces, on the edges, so as to obtain articulation of all these elements relative to one another.

According to another embodiment of the present invention, the spherical surfaces 6 may be replaced by plane surfaces which are perpendicular to the axis of the capillary 2. In this case, the adjustment of the mirrors 21, 17 and 18 are effected separately by any conventional means. If so desired, it is also possible for the mirror 17 to be supported by a piezoelectric ceramic sleeve, as in the case of the mirrors 18 and 21.

It is to be noted that the sleeves such as 22, 19 or 19' consisting of piezoelectric ceramics (FIG. 3), may comprise resilient means which are illustrated diagrammatically at 25 and 26, which permit the orientation of the mirrors to be adjusted.

According to one particular embodiment, it is possible to use a laser tube of which the dimensions are, for example, $L_2+L_1$ 1.50 meters; $L_1+L_3$ 8 cm., with reflection coefficients for the mirrors 21, 18 and 17 equal to 1 and, for the Brewster plate 9, a transmission and reflection coefficient equal to 0.5. With such arrangements, a monomode laser beam of high power is obtained, of which the energy is approximately 15 mw.

The piezoelectric ceramic elements designed for causing variation in the distance of the mirrors may comprise two metal electrodes, such as 24 and 24', connected to a signal generator 27, which is controlled by a data processing circuit 28, of which the input is connected to the output of a detector 29 placed in the direction of the laser beam emerging through the passage 11. This associated electronic circuit permits the regulation of the various parameters of the monomode laser according to the invention, as well as the stabilization of this laser.

Figure 3:
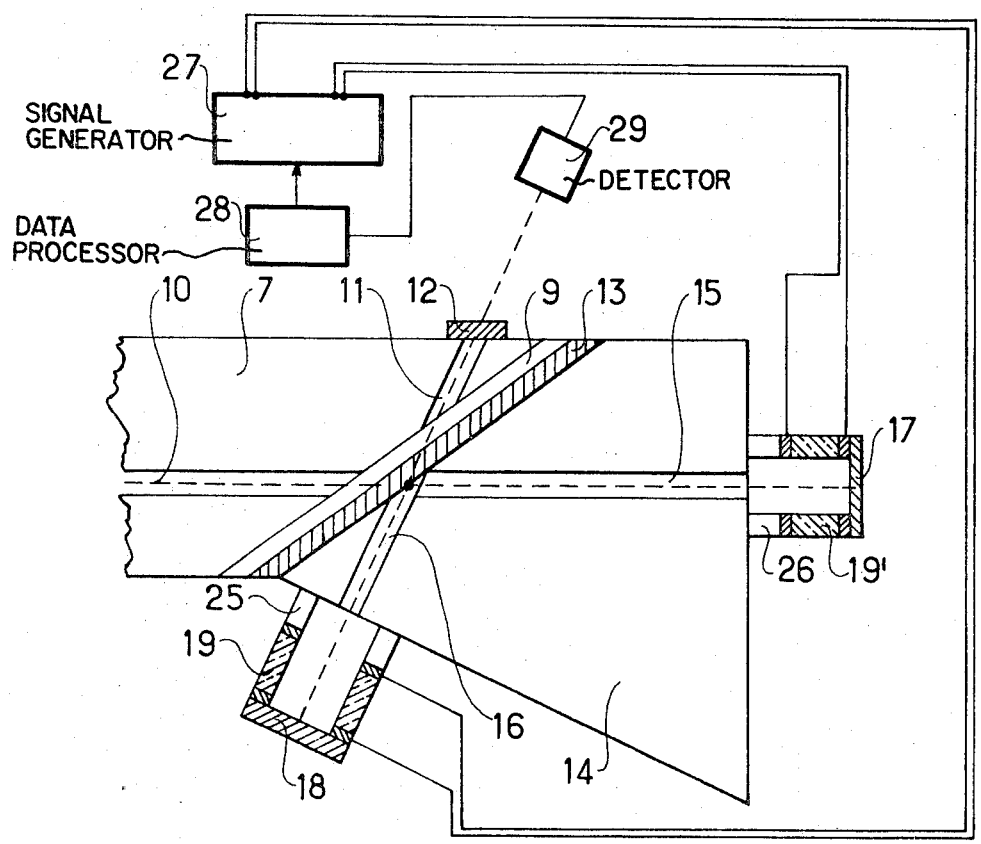
FIG. 3 is a section, on a larger scale, of a part of a laser according to the invention.

It is also possible to control the position of the mirrors 17 and 18, as illustrated in FIG. 3, as such or in combination with the control of the mirror 21 illustrated in FIG. 2.

Figure 4:
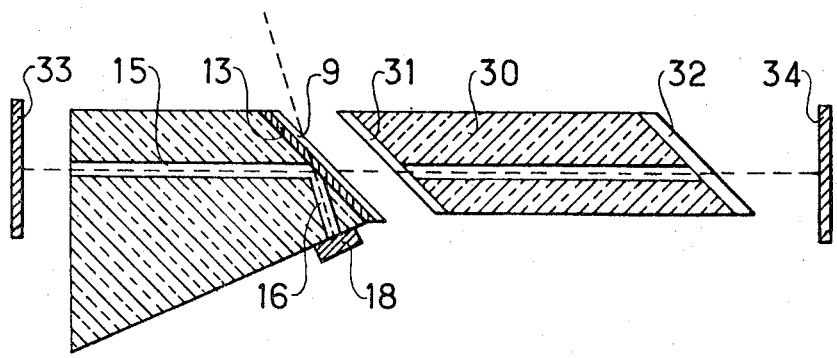
FIG. 4 is a diagrammatic sectional view of another embodiment of a laser according to the invention.

FIG. 4 represents another embodiment of the invention. In this case, an existing laser assembly, formed by a laser tube represented diagrammatically at 30 and provided with two end faces 31 and 32 inclined with Brewster incidence is used. The laser is disposed in a cavity formed by two mirrors 33 and 34. This laser is transformed into a power monomode laser by the addition of an element disposed between the tube 30 and, for example, the mirror 33.

This element is similar to that indicated in FIGS. 2 and 3. It is evident that the plate 9 of this element may be cemented to plate 31 of the laser 30 or even that this plate 9 may replace the plate 31 by cementing or welding onto the tube 30 itself.

On the other hand, all the associated arrangements for control regulation, described with reference to FIGS. 2 and 3, may be adopted in the case of the embodiment according to FIG. 4.

We claim:

1. In a power monomode laser generator including a first linear Fabry-Perot cavity containing a laser tube and defined by a first mirror and a second mirror, a second cavity formed by the said first mirror and a third mirror and coupled with the first cavity by means of a semireflecting plate disposed on the axis of the first cavity. The improvement wherein said semireflecting plate is kept at Brewster incidence in the said first cavity by a prismatic element comprising two passages, the first passage of which is disposed in alignment with the passage of the said laser tube, the second passage of which has for its axis the portion of the said second cavity adjacent the third mirror, and the axes of the said prismatic element passages converge on said semireflecting plate.

2. The laser generator according to claim 1 wherein one of the said second and third mirrors is fixed to the first prismatic element.

3. The laser generator according to claim 1 wherein one of the said second and third mirrors is fixed to the first prismatic element by means of a piezoelectric transducer.

4. The laser generator according to claim 3, wherein said transducer is connected to the output of a controlling signal generator connected to a control photodetector positioned in the path of at least one part of the emergent laser beam.

5. The laser generator according to claim 1, wherein said semireflecting plate, disposed on the prismatic element, is fixed to the end of the laser tube, and this tube also comprises an outlet passage for the beam which is disposed as the extension of the second passage.

6. The laser generator according to claim 5, wherein the exit passage for the beam is closed by a plate situated at Brewster incidence.

7. The laser generator according to claim 1, wherein the semireflecting plate forms the outlet plate of the laser tube.

8. The laser generator according to claim 1, further including at least one ball and socket joint which articulately joins the laser tube with the remainder of the generator body carrying the mirrors of the Fabry-Perot cavities.